March 17, 1925.
C. L. JOHNSON
1,529,743
SPRING RELEASED TRANSMISSION HOUSING COVER LOCKING MEANS
Filed July 15, 1922
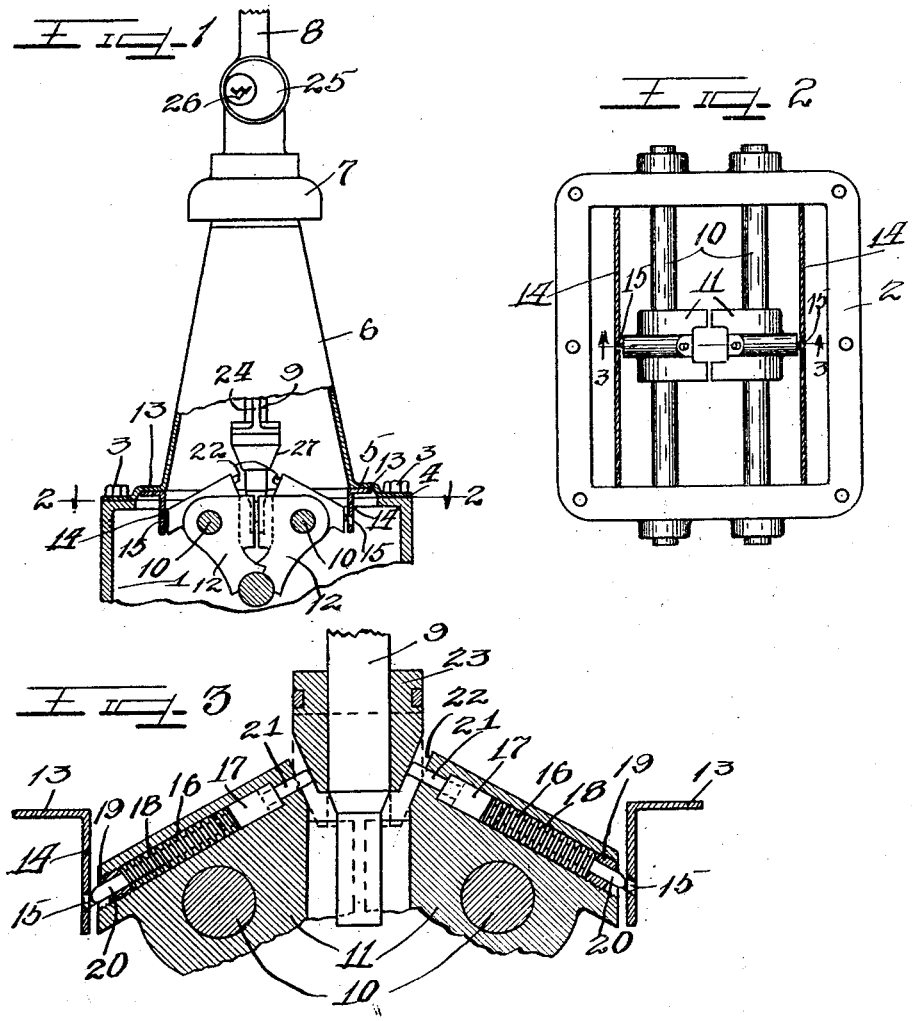
Witnesses
Inventor
Colvin L. Johnson
by Charles W. Hills Atty.

Patented Mar. 17, 1925.

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

SPRING-RELEASED TRANSMISSION-HOUSING-COVER-LOCKING MEANS.

Application filed July 15, 1922. Serial No. 575,382.

*To all whom it may concern:*

Be it known that I, COLVIN L. JOHNSON, a citizen of the United States, and a resident of the city of St. Louis, State of Missouri, have invented certain new and useful Improvements in a Spring-Released Transmission - Housing - Cover - Locking Means; and I do hereby declare that the following is a full, clear, and exact description of the same, reference being had to the accompanying drawings, and to the numerals of reference marked thereon, which form a part of this specification.

This invention relates to spring-released transmission housing cover locking means, and particularly to means which are adapted to prevent the removal of the cover from a transmission housing or casing when the transmission gears are in a predetermined position.

In order to prevent the theft or unauthorized use of motor vehicles and other gear operated mechanisms, it is customary in many cases to lock the transmission gears thereof in a neutral or inoperative position by means of locking devices which are associated with the gear shift lever or otherwise. While such locking means are highly successful in attaining their desired purpose, it is nevertheless possible in certain cases to remove the transmission housing cover and the gear locking means, after which the gears may be shifted into operative position and the vehicle or other mechanism operated.

It is an object therefore of the present invention to provide means which are adapted to be associated with a gear shift locking device for locking the cover on a transmission housing.

It is another object of this invention to provide spring released transmission housing cover locking means which are moved into and maintained in locking position by a gear shift locking means.

It is also an important object of this invention to provide means associated with the transmission mechanism which are adapted to be moved into position to lock a cover on the housing or casing for said mechanism.

Other and further important objects of this invention will be apparent from the disclosures in the specification and the accompanying drawings.

The invention (in a preferred form) is shown on the drawings and hereinafter more fully described.

On the drawings:

Figure 1 is a fragmentary elevation with parts in section showing the gear shift locking means and the housing cover locking means associated therewith.

Figure 2 is a slightly enlarged section on the line 2—2 of Figure 1 with parts omitted.

Figure 3 is an enlarged fragmentary section on the line 3—3 of Figure 2.

As shown on the drawings:

The reference numeral 1 indicates a transmission housing or casing in which a usual change speed transmission mechanism is mounted. Mounted upon the upper edge of said housing or casing 1, is an inwardly extending flange 2 to which the transmission housing cover is secured by means of machine screws 3 in the usual manner. Said cover comprises a flange 4 through which the machine screws 3 are engaged, and integral with said flange 4 and at a slightly higher level is an inwardly extending integral horizontal portion 5, and extending upwardly at the center of the casing from said horizontal portion 5, is a dome portion 6 which affords at 7 a universal support for a gear shift lever 8 which is provided with a depending portion 9 extending downwardly therefrom through the interior of the dome portion.

Extending longitudinally of the casing 1 are parallel guide rods 10, on which are slidably mounted blocks 11 having oppositely positioned notches or cutaway portions in their inner faces and having integral therewith and depending therefrom gear shifting forks 12 of usual design.

Extending longitudinally of the casing 1 and secured to the inside of the horizontal portion 5 of the cover for the casing 1 are parallel longitudinal members 13, each of which is provided with an integral depending flange 14, and formed in said flanges 14 are oppositely positioned apertures 15 which slope downwardly and outwardly as clearly shown in Figures 1 and 3. Said longitudinal members 13 are secured to the inner faces of the horizontal portions 5 by welding or in any other manner whereby access thereto from the outside of the casing is prevented. Formed in the blocks 11 adjacent to and parallel with the upper faces thereof are recesses 16 and slidably mounted in each of said recesses 16 is a cylinder 17 which is normally held against the inner end of the recess by means of a coil spring 18 engaged in said recess between the outer end of the cylindrical block 17 and the inner end of a plug 19 threaded in the outer end of said recess 16. Integral with each of the cylindrical blocks 17 and extending axially through the springs 18 are pins 20 which are slidably engaged through the plugs 19 and the rounded ends of which are adapted to be engaged through the apertures 15 when said block 17 and pins 20 are forced outwardly, thereby locking the flanges 14 and members 13 and consequently the cover to the blocks 11 and rods 10, and thereby locking the cover from movement relative to the casing 1. Integral with the cylindrical block 17 and extending inwardly through reduced passages formed in the blocks 11 and communicating with the recesses 16 are pins 21 which normally extend beyond sloping faces 22 formed on the upper and inner sides of the blocks 11.

Means associated with the means for locking the gear shift mechanism are provided for forcing the pins 20 outwardly through the apertures 15 and locking the same in such position to prevent the unauthorized removal of the cover for the casing 1. Said means comprise a block 23 which is slidably mounted on the depending portion 9 of the gear shift lever and which is adapted to be reciprocated on said depending portion by a vertical member 24 secured thereto and operated by a locking mechanism 25 mounted on the gear shift lever above the dome-shaped portion 6 of the casing cover. Said locking member 25 is adapted to be rotated into locked position by means of a suitable key inserted in the slot 26, and when rotated to such locked position the member 23 is moved downwardly until inwardly sloping faces 27 formed thereon contact with the faces 22 on the blocks 11, thus forcing the pins 20 outwardly through the apertures 15 preventing removal of the casing cover and at the same time preventing lateral movement of the depending portion of the lever, and consequently preventing the shifting of the gears from neutral position.

It is thus apparent that this invention provides means which are adapted to be associated with the locking means for the gear shifting device and which act, when said locking means are in locked position, to lock a cover in position on a casing or housing for the gears, thereby preventing unauthorized removal of the cover and the shifting of the gears into operative position.

I am aware that numerous details of construction may be varied through a wide range without departing from the principles of this invention, and I therefore do not purpose limiting the patent granted hereon otherwise than is necessitated by the prior art.

I claim as my invention:

1. The combination with a casing, of transmission gear shifting forks therein, a lever for shifting said forks, a cover on the casing supporting said lever, means slidably mounted on the lever for locking the same from movement and locking the forks in a predetermined position, and means associated with said slidably mounted means for locking said cover on the casing when said means are in locked position.

2. The combination with a casing, of transmission gear shifting forks therein, a lever for shifting said forks, a cover on the casing supporting said lever, means slidably mounted on the lever for locking the same from movement, means associated with said slidably mounted means for locking said cover on the casing when said means are in locked position, and resilient means for rendering said cover locking means normally inoperative.

3. The combination with a casing of transmission gear shifting forks therein, a lever for shifting said forks, a cover on the casing, means slidable on the lever for locking the lever from movement, and means associated with said lever locking means for locking said cover on the casing when said lever locking means are in locked position.

4. The combination with a casing, of transmission gear shifting forks therein, means for shifting said forks, a cover on the casing, key operated means on the shifting means for locking said shifting means in inoperative position, and means operable by said locking means for locking the cover on the casing.

5. The combination with a casing, of transmission gear shifting forks therein, means for shifting said forks, a cover on the casing, means slidable on the shifting means for locking the same in inoperative position, and slidably mounted means operated by said locking means for locking the cover on the casing.

6. The combination with a casing, of transmission gear shifting forks therein, means for shifting said forks, a cover on the casing, apertured means secured to the inside of the cover and depending therefrom, and means associated with the fork shifting means adapted to be engaged through the apertures in said last mentioned means to lock the cover on the casing.

7. The combination with a casing, of transmission gear shifting forks therein, means for shifting said forks, a cover on the casing, apertured means secured to the inside of the cover and depending therefrom, and spring retracted pins associated with the fork shifting means and adapted to be engaged through the apertures in said last mentioned means to lock the cover on the casing.

8. The combination with a casing, of transmission gear shifting forks therein, means for shifting said forks, a cover on the casing, means slidable on the shifting means for locking said shifting means in inoperative position, and slidably mounted spring retracted means for locking the cover on the casing, said means being adapted to be moved into operative position by the slidable means on said shifting means.

In testimony whereof I have hereunto subscribed my name in the presence of two subscribing witnesses.

COLVIN L. JOHNSON.

Witnesses:
CARLTON HILL,
OSCAR HARTMANN.